United States Patent [19]

Manning et al.

[11] Patent Number: 4,479,486
[45] Date of Patent: Oct. 30, 1984

[54] METHOD FOR UTILIZATION OF OIL FIELD WASTE BRINE TO DEVELOP A SALT GRADIENT SOLAR POND

[75] Inventors: Robert A. Manning; Thomas P. Wisneski, both of San Antonio, Tex.

[73] Assignee: Applied Solar Engineering, Inc., San Antonio, Tex.

[21] Appl. No.: 544,474

[22] Filed: Oct. 24, 1983

[51] Int. Cl.³ ............................................. F24J 3/02
[52] U.S. Cl. .................................. 126/415; 60/641.8; 126/452; 210/747; 159/1 S
[58] Field of Search ........................ 126/415, 416, 452; 60/641.1, 641.8, 641.11, 641.9; 166/267; 159/1 S; 210/170, 747; 23/295 S, 298

[56] References Cited

U.S. PATENT DOCUMENTS

| | | | |
|---|---|---|---|
| 3,372,691 | 3/1968 | Shachar | 126/415 |
| 3,667,980 | 6/1972 | Neitzel et al. | 159/1 S |
| 4,063,419 | 12/1977 | Garrett | 126/415 |
| 4,088,451 | 5/1978 | Sadan | 23/295 S |
| 4,110,172 | 8/1978 | Spears, Jr. | 159/1 S |
| 4,169,791 | 10/1979 | Johnson, Jr. et al. | 210/170 |
| 4,283,913 | 8/1981 | Loeb | 126/415 |
| 4,345,581 | 8/1982 | Shacher | 210/170 |
| 4,408,459 | 10/1983 | Yogev | 126/415 |

OTHER PUBLICATIONS

Lin, E. I. H., "A Review of the Salt-Gradient Solar Pond Technology" Jan. 30, 1982 (Jet Propulsion Lab. Publication B1-116).

Primary Examiner—James C. Yeung
Attorney, Agent, or Firm—Gunn, Lee & Jackson

[57] ABSTRACT

A process and method is disclosed for utilizing oil field waste brine to develop and maintain a salt gradient solar pond which in turn provides thermal energy for doing work, including improved separation of oil/brine emulsions into waste brine, crude oil, and natural gas; hot brine from the storage layer of the developed solar pond provides heat to a process heat exchanger which is intended to elevate the temperature of a working fluid such as an emulsion of crude oil and brine coming from producing oil wells prior to a separation process within a conventional heater treater. Less fuel is required to operate the heater treater. Waste brine from the crude oil process is utilized to develop and maintain the solar pond rather than simply being disposed.

8 Claims, 3 Drawing Figures

METHOD FOR UTILIZATION OF OIL FIELD WASTE BRINE TO DEVELOP A SALT GRADIENT SOLAR POND

BACKGROUND OF THE INVENTION

This invention relates to a process whereby oil field waste brine is utilized to develop and maintain a salt gradient solar pond which in turn provides thermal energy for doing work, including improved separation of oil/brine emulsions into waste bring, crude oil, and natural gas. A salt gradient solar pond (SGSP) is a simple, low-cost device for collecting and storing solar energy. It consists of water whose salt concentration, and therefore density, increases with depth. The deepest zone, i.e., storage area, is heated by incoming solar radiation and, due to its high density, remains near the pond bottom. The upper pond layers act as insulation for the hot brine in the storage layer.

The solar pond has been described as the simplest technique for direct thermal conversion of solar energy. It is simultaneously a collector of solar radiation and a large body of thermal storage. Because of its massive thermal storage and relatively low heat losses, the pond converts an intermittent energy source into a reliable and continuous source of thermal energy.

In a normal body of water a portion of the solar radiant energy penetrates into the sub-layers. As the radiant energy passes through successive layers, it is gradually absorbed and causes the water to warm. The warming decreases the density and the water rises, carrying with it the absorbed solar energy. At the surface, the energy is lost to the atmosphere by radiation, convection, and through evaporation. Thus, the body of water remains cool.

In a salt gradient solar pond, density is made to increase with depth. This condition is achieved with a high salt concentration at the bottom and a low concentration at the surface. With a sufficiently high saline concentration, lower zone waters can absorb solar energy and yet remain denser than the waters immediately above. Bottom-to-surface convection currents are eliminated; therefore, the lower zone waters remain in place and continue to absorb solar energy. Temperatures approaching 100° C. (212° F.) have been observed at the bottom zone of working solar ponds.

Existing crude oil production processes utilize a device known as a "heater treater" to separate crude oil from naturally occurring brines. An emulsion of crude oil/brine, and natural gas flows from production wells into a gathering line and then into a gas-fired heater treater. At the heater treater the emulsion is heated to a desired operating temperature of approximately 140° F. in order to lower the constituent viscosities, and increase differences in specific gravity of brine and oil, thus allowing faster settling of the brine. Consequently, there always exists three distinct commodities within the heater treater, i.e., natural gas, crude oil, and brine. The natural gas produced with the crude oil exits the top of the heater treater. A portion of the natural gas is diverted for consumption as the fuel in the heater treater while most is piped to a compressor. Then, the gas is reinjected into the geologic formation to assist in future oil recovery; it can be recovered for eventual sale whenever economic factors warrant.

The crude oil exits from the heater treater at a level lower than that for the natural gas. It flows into stock tanks to await eventual sale. At this point the crude oil, which may contain as much as 30% brine by weight when produced, normally contains less than 1%.

The brine is the densest commodity produced, so it occupies the lowest portion of the heater treater. From there it is transferred to a storage point, and is periodically collected by a commercial brine disposal vacuum truck. Disposal costs can be considerable to the oil producer. This brine is also regarded as a fresh ground water hazard, and its disposal is closely regulated. The ultimate depository of the brine is usually a carefully chosen well, although a lined pit is an acceptable alternative.

SUMMARY OF THE INVENTION

The process of this invention focuses on the application of SGSP technology to the crude oil production operation. The SGSP developed from oil field waste brine is intended to provide process heat to do work at or near the oil field. A preferred embodiment provides process heat to an emulsion of crude oil and brine that comes from producing wells in order to assist in the separation of the oil from the waste brine. The hot brine from the storage area of the SGSP displaces the need for natural gas in the "heater treater" commonly used for the purpose of separating the oil from the waste brine. Further, pond development processes of the invention have been established that use the waste brine from crude oil production as a low-cost source of salt water for the SGSP itself.

It is an object of the invention to utilize the high temperature brine in the bottom zone of a SGSP developed from oil field waste brine to supply thermal energy to process heat exchangers in the crude oil production process. When such energy is developed, such energy is applied to other of the crude oil production processes, such as pumping and system control and to work processes near the pond, such as irrigation systems. Where the energy is used to preheat oil/brine emulsions, the preheated emulsions require less natural gas to be used in the process, resulting in more natural gas being available for resale.

It is yet another object of the process of the invention that the waste brine from the crude oil production process be utilized to maintain the salt gradient solar pond, which in turn generates hot brine for heat transfer within the process heat exchanger in the crude oil production process. A recycle loop is thus established, and expensive brine disposal alternatives are avoided.

DETAILED DESCRIPTION OF THE PREFERRED EMBODIMENT OF THE INVENTION

Figure 1:
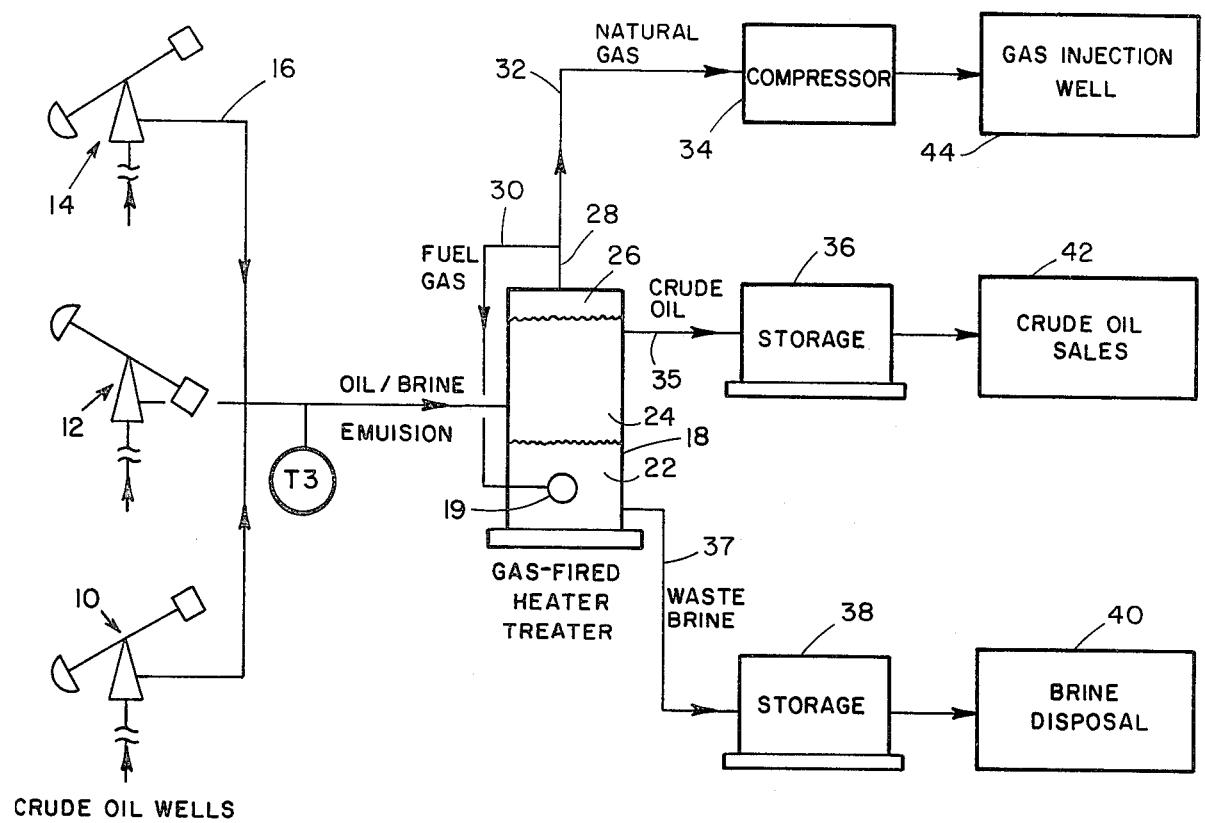
FIG. 1 is a schematic of the existing crude oil production process.

In the existing crude oil production process, shown in FIG. 1, an emulsion of crude oil and brine flows from each of several production wells 10, 12 and 14 into a single gathering line 16 and then into a gas-fired "heater treater". A parallel flow path may exist for the emulsion from wells on a separate lease. In such circumstances, the crude oil from the two leases must not comingle; and entirely separate processing facilities are required.

Although the following process description is for a single flow path, it should be understood that additional flow paths for the crude oil production process could exist.

The emulsion of crude oil and brine flowing from the production wells also contains natural gas and small amounts of basic sediments and water (BS and W). The relative amounts of each of the above constituents is variable from well to well, and from one time period to another.

At heater treater 18 the emulsion from gathering line 16 is heated to approximately 140° F. Consequently, three constituent commodities exist within the heater treater 18, i.e., natural gas 26, crude oil 24, and brine 22. The natural gas 26 produced with and released from the crude oil 24 exists the top of the heater treater 18 via line 28. Some of the natural gas 26 is diverted for consumption as fuel in the heater treater 18 via return line 30; most natural gas 26 is piped via conduit 32 to compressor 34. Subsequently, the gas 26 is reinjected 44 into the geologic formation. It can be recovered for eventual sale.

The crude oil 24 exists from the heater 18 at a level lower than that for the natural gas 26. The crude oil 24 flows through line 35 to one of several storage tanks 36, each generally having a 500 barrel capacity, to await eventual sale 42. The oil 24 may be loaded into tank trucks at the site, or it may be pumped to customer storage tanks located at distant locations.

The naturally occurring brine 22 occupies the lowest portion of the heater treater 18. From the heater treater 18, it is transferred via line 37 to a storage point 38, and is periodically collected by a commercial brine disposal vacuum truck 40.

The temperature of the oil/brine emulsion, T3, as it exists in the underground formation, is essentially constant throughout the year. However, the gathering line 16 from the wells to the heater treater 18 may be up to half a mile long and are usually uninsulated. Consequently, the temperature of the emulsion as it enters the heater treater 18, varies seasonally in response to intervening conditions. Insulating the gathering lines 16 is undesirable both economically and thermally, since, for large portions of the year in some portions of the world, the exposed pipes act as solar collectors. In south Texas, for example, during the summer, as much as 30° F. may be added to the emulsion temperature.

Figure 2:
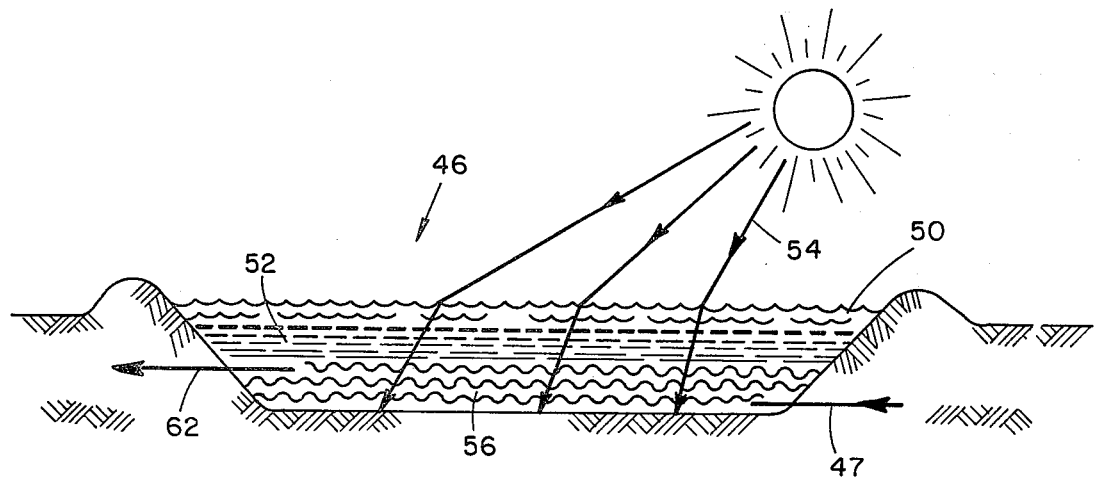
FIG. 2 is a schematic of a typical salt gradient solar pond.

FIG. 2 is a schematic diagram of the salt gradient solar pond 46 showing three distinct zones. The surface, or upper convection zone 50, is a six to twelve inch thick layer of very low concentration brine, i.e., less than 4% by weight, that exists mainly as a result of natural wind stirring effects. The gradient, or nonconvecting zone 52, is three to four feet deep with salt concentration increasing with the depth (from less than 4% at the top to as high as 25% at the bottom). This gradient zone 52 is the key to the successful operation of the solar pond. It passes radiant energy 54 to the lower, or storage, zone 56 and acts as an insulator between the storage zone 56 and the surface zone 50, a function similar to the glazing layer of a flat plate collector. The storage, or lower convection zone 56, can range in depth from three feet to fifteen feet, depending on the process temperatures and seasonal load distribution required. The salt concentration is very high in this storage zone, i.e., up to saturation. As its name implies, this storage zone 56 receives and stores solar radiation 54 for use whenever needed; long term storage of solar energy 54 is achieved through massive thermal capacity.

During the normal operation of the pond 46, dissolved salt will gradually migrate, or diffuse, from the storage layer 56 to the surface layer 50. This action tends to destroy the salinity gradient. In order to maintain the proper gradient, the surface layer 50 must be flushed with fresh or low salinity water from time to time. Meanwhile, high salinity brine must be injected into the storage layer 56 to make up the salt loss.

Figure 3:
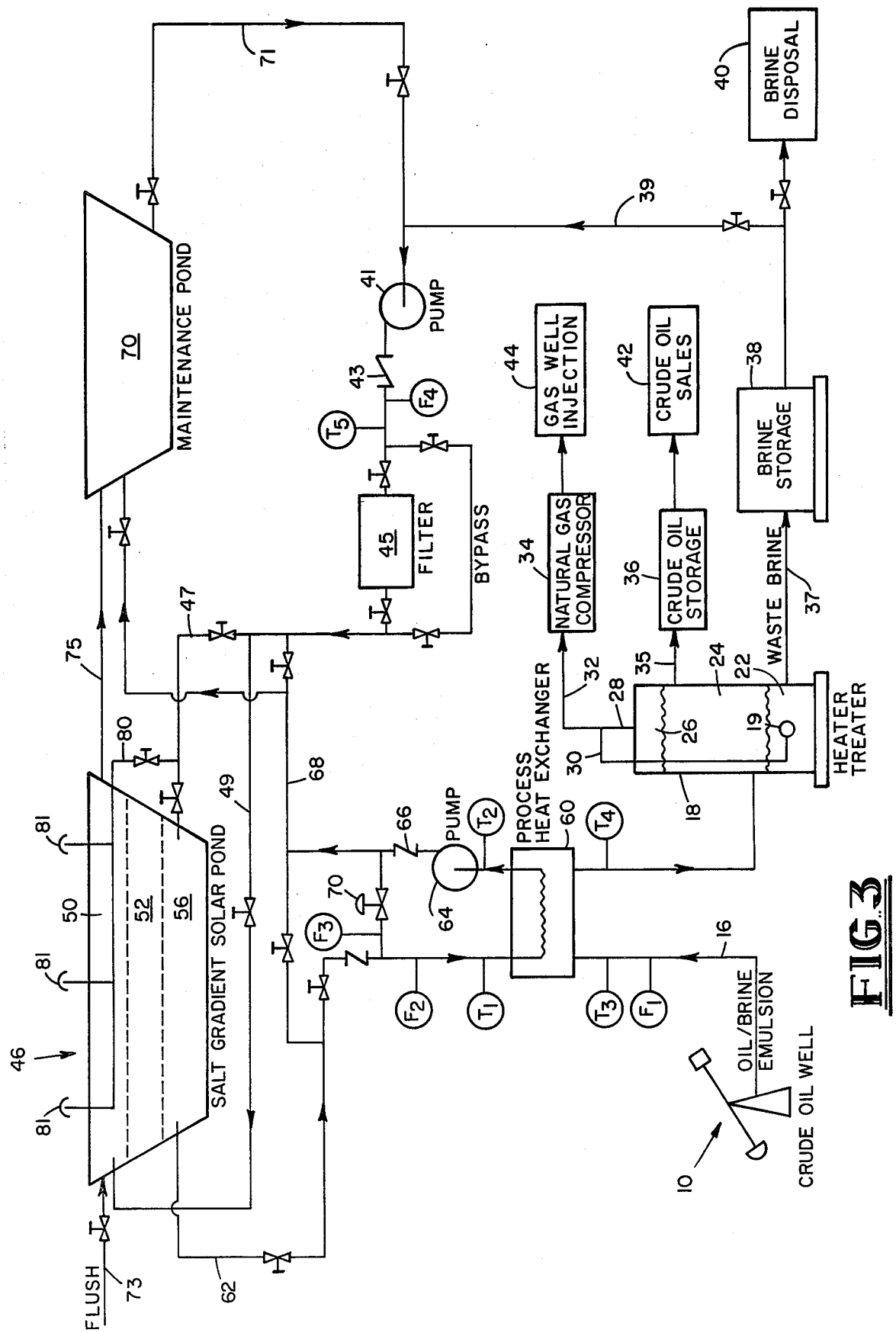
FIG. 3 is a schematic of the process of the invention.

The basic intended function of the salt gradient solar pond (SGSP) 46 is to displace most of the conventional fuel usage in the heater treater 18 by preheating the oil/brine emulsion. FIG. 3 schematically shows the solar pond in operation, and its interface with the crude oil production process. The flow path of the incoming emulsion is similar to that described above for FIG. 1, except that it passes through a process heat exchanger 60 before entering the heater treater 18. In the exchanger 60, solar pond heat is transferred to the oil/brine whenever the heat is available. The emulsion then enters the heater treater 18 where additional heat is added, if necessary, by heater 19. The higher inlet temperature, T4, to the heater treater 18 provided by the pond 46 will result in more natural gas 26 being available for sale or reinjection.

The heat from the SGSP is carried to the external process exchanger 60 in the form of hot brine from the storage layer 56 by way of conduit 62. After passing through the exchanger 60, the brine is pumped via exchanger pump 64 through check valve 66 back into the storage layer 56 via return conduit 68. The process loop from the pond 46 operates whenever the oil/brine emulsion is flowing, usually twenty-four hours per day.

During the summer and fall, the SGSP storage layer 56 will be hot enough to heat the oil/brine emulsion well above the desired 140° F. If this occurs, the lighter hydrocarbon components are released from the crude oil 24 in the form of gas, which in turn reduces the valve of the crude oil. To prevent this overheating, a proportional temperature control valve (TCV) 70 is incorporated into the SGSP process loop near the exchanger 60. Whenever the oil/brine temperature, T4, rises above the desired set temperature, the TCV 70 opens and the pond side inlet temperature, T1, to the exchanger 60 is lowered, as required. This proportional control scheme insures that the 140° F. maximum oil/brine outlet temperature, T4, will always be met.

While the operation and maintenance requirements of a salt gradient solar pond are minimal when compared to those of other energy-producing techniques, improper maintenance can result in degradation of the critical salt gradient zone and subsequent inability of the pond to store solar energy.

The principal maintenance requirement of the SGSP involves the distribution of salt within the various layers. Natural diffusion forces are continuously moving salt from the region of high concentration (storage layer 56) to the region of low concentration (surface layer 50). Unchecked, the salinity-induced density gradient eventually becomes weaker than the opposing temperature-induced density gradient, and thermally-induced convection begins. The heat in the storage layer 56 is carried to the surface 50 and lost. To prevent this problem, the pond surface 50 is periodically flushed into an evaporative or maintenance pond 70 using fresh make-up water via line 73 or low salinity waste brine from storage tank 38 via lines 39 and 49. In the evaporative pond 70, the surface brine 50 is naturally concentrated, and then injected into the storage layer 56 through conduit 71, pump 41, filter 45, conduit 47 into pond 46. Further, a gravity overflow line 75 is provided, to carry flushed brine into the evaporation pond 70.

At times when the natural evaporation exceeds rainfall, make-up water must be used to prevent the pond level from falling. By using the on-site brine 38, the site owner will incur minimal disposal expenses for the life of the facility. FIG. 3 shows the flow path of the make-up brine loop as brine from storage 38 passes through conduit 39 to pump 41 through check valve 43 through filter 45 through conduit 49 to pond 46.

In addition to evaporative make-up, low salinity water is also needed to flush the surface of pond 46 of debris. To accomplish this, make-up brine from storage tank 38 is routed through pump 41 to the surface of pond 46 via conduit 49.

As has been state solar ponds can achieve boiling temperatures. To prevent the destructive effects on the gradient layer 52 that boiling causes, provision is made to transfer hot brine from the storage layer 56 to the evaporative pond 70 via lines 62 and 68 whenever the threat arises.

During noraml SGSP operation, small internal convection layers develop which must be eliminated. The upper and lower boundaries of the gradient layer 52 require adjustment due to the erosive effects of natural convection in the surface layer 50 and storage layer 56. In order to perform these and other miscellaneous gradient maintenance tasks, it is necessary to inject (or remove) brine of various concentrations into (or out of) various levels of the pond. Consequently, movable nozzles, or diffusers, are provided on the inlet and outlet lines of the pond.

Proper brine clarity is maintained in two ways. First, the cartridge filter 45 with appropriate filter medium can be used to clean the brine as it flows from brine storage 38 to pond 46, or from maintenance pond 70 to pond 46. Second, a copper sulfate/hydrochloric acid solution can be applied to the SGSP surface 50.

The process of developing the SGSP using oil field brine involves two major steps. First, the brine must be procured in adequate quantity and within a reasonable time frame. Second, the brine needs to be partially evaporated to achieve desirable concentrations, again within a reasonable time frame. Each step is unique in its oil field application.

To develop a salt gradient solar pond large quantities of concentrated brine are required. To develop the solar pond within a realistic time frame at a facility with low concentration waste brine, i.e., 2½%, then initially, much of the brine must come from other crude oil producers. If this off-site brine is also of a low concentration, then it must be evaporated to higher concentrations within a reasonable time period. Even at a site which is hot, dry, and sunny, to concentrate the brine using natural evaporation requires either a very large evaporation pond (many times the size of the solar pond being developed) or an unreasonably long time period. Clearly enhanced evaporation is necessary.

Enhanced evaporation requires that the amounts of thermal energy used to drive the process be increased. Incoming air, i.e. local wind, contains a thermal source that can be transferred convectively to the brine. But in order to move adequate amounts of heat, the area of brine in contact with the wind must be greatly increased beyond that of a still pond. This increased heat transfer area can be obtained by spraying the brine upward, creating a "fog" above the surafce. The air entering the fog transfers sensible heat to brine while simultaneously absorbing moisture from the droplets. Calculations indicate that using this procedure, development can be achieved using the pond itself for evaporation, within a reasonable time frame.

In FIG. 3, pond spray subsystem 80 is schematically shown with evaporative spray nozzles 81.

Although the preferred embodiment method of the invention has been disclosed and discussed, it is understood that other applications of the invention are possible and the embodiments and method disclosed may be subject to various changes, modifications, and substitutions without necessarily departing from the spirit of the invention.

We claim:

1. A method for utilizing oil field waste brine to develop a salt gradient solar pond to provide thermal energy for doing work which comprises:
    (a) collecting oil field waste brine from at least one crude oil production process;
    (b) delivering said oil field waste brine to a pit;
    (c) partially evaporating said oil field waste brine to achieve desirable brine concentrations in said pit;
    (d) distributing said brine concentrations in generally horizontal layers within said pit such that a surface layer, a gradient layer and a storage layer are established, said surface layer having a lower concentration of brine, said gradient layer having intermediate concentrations of brine, and said storage layer having a higher concentration of brine;
    (e) developing hot brine in said storage layer;
    (f) transferring a portion of said hot brine from said storage layer to a process heat exchanger;
    (g) passing of a working fluid through said process heat exchanger wherein said hot brine transfers thermal energy to said working fluid resulting in a higher temperature working fluid and a reduced temperature brine;
    (h) transferring said reduced temperature brine from said heat exchanger back to said storage layer;
    (i) passing said higher temperature working fluid through a motor for doing work.

2. The invention of claim 1 wherein said working fluid is a crude oil/brine emulsion and said motor for doing work is a crude oil heater treater wherein said crude oil/brine is separated into natural gas, crude oil, and additional oil field waste brine and further comprising the step of:
    transferring of said additional oil field waste brine from said heater treater to a crude oil production process brine storage member.

3. The invention of claim 1 wherein said motor for doing work is a turbine.

4. A method for utilizing oil field waste brine to develop a salt gradient solar pond to provide thermal energy for improved separation of crude oil/brine emulsions which comprises:
    (a) collecting oil field waste brine from at least one crude oil production process;
    (b) delivering said oil field waste brine to a pit;
    (c) partially evaporating said oil field waste brine to achieve desirable brine concentrations in said pit;
    (d) distributing said brine concentrations in generally horizontal layers within said pit such that a surface layer, a gradient layer, and a storage layer are established, said surface layer having a lower concentration of brine, said gradient layer having intermediate concentrations of brine, and said storage layer having a higher concentration of brine;

(e) developing hot brine in said storage layer;

(f) transferring a portion of said hot brine from said storage layer to a process heat exchanger;

(g) passing a crude oil/brine emulsion through said process heat exchanger wherein said hot brine transfers thermal energy to said emulsion resulting in a higher temperature emulsion and a reduced temperature brine;

(h) transferring said reduced temperature brine from said heat exchanger back to said storage layer;

(i) passing said higher temperature emulsion through a crude oil heater treater for separation into natural gas, crude oil and additional oil field waste brine;

(j) transferring of said additional oil field waste brine from said heater treater to a crude oil production process brine storage member.

5. The invention of claim 4 further comprising the step of:

maintaining said desirable brine concentrations in said pit by a controlled transferring of portions of said additional oil field waste brine from said storage member, and/or portions of fresh water from a fresh water make-up source, to said pit.

6. The invention of claim 5 further comprising the step of:

periodically flushing said surface layer with a portion of fresh water from said fresh water make-up source and/or said additional oil field waste brine with the flushed portion of said surface layer being transferred to an evaporative pond.

7. The invention of claim 5 comprising the step of:

transferring a portion of said hot brine in said storage layer to said evaporative pond when the temperature of said hot brine exceeds a set temperature.

8. The invention of claim 4 wherein the transferring of said hot brine in step (f) is regulated by a control menas such that said higher temperature emulsion of step (g) is less than a desired operating temperature.

* * * * *